(12) United States Patent
Lovett et al.

(10) Patent No.: US 9,827,950 B2
(45) Date of Patent: Nov. 28, 2017

(54) LOCKING ASSEMBLY AND METHOD WITH AUTHENTICATED UNLOCKING OF ELECTRIC VEHICLE SUPPLY EQUIPMENT

(71) Applicant: FORD GLOBAL TECHNOLOGIES, LLC, Dearborn, MI (US)

(72) Inventors: Karin Lovett, Novi, MI (US); Ray C. Siciak, Ann Arbor, MI (US); James Michael Weinfurther, Farmington, MI (US); Ahmet Cinar, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/069,339

(22) Filed: Mar. 14, 2016

(65) Prior Publication Data

US 2017/0259785 A1 Sep. 14, 2017

(51) Int. Cl.

| | |
|---|---|
| B60R 25/20 | (2013.01) |
| E05B 83/34 | (2014.01) |
| E05B 81/04 | (2014.01) |
| E05B 81/56 | (2014.01) |
| E05B 81/80 | (2014.01) |
| E05B 19/00 | (2006.01) |
| B60R 25/24 | (2013.01) |
| B60L 11/18 | (2006.01) |
| B60R 25/01 | (2013.01) |

(52) U.S. Cl.
CPC ...... *B60R 25/2018* (2013.01); *B60L 11/1816* (2013.01); *B60R 25/01* (2013.01); *B60R 25/24* (2013.01); *E05B 19/0082* (2013.01); *E05B 81/04* (2013.01); *E05B 81/56* (2013.01); *E05B 81/80* (2013.01); *E05B 83/34* (2013.01); *B60L 2270/30* (2013.01)

(58) Field of Classification Search
CPC ...... E05B 19/0082; E05B 81/04; E05B 81/56; E05B 81/80; E05B 83/34; B60R 25/2018; B60R 25/24; B60R 25/01; B60L 11/1816; B60L 2270/30
See application file for complete search history.

(56) References Cited

U.S. PATENT DOCUMENTS

| | | | |
|---|---|---|---|
| 7,950,943 B2 | 5/2011 | Ohtomo | |
| 8,016,604 B2 | 9/2011 | Matsumoto et al. | |
| 8,022,808 B2 * | 9/2011 | Kurpinski | B60R 25/246 340/425.5 |
| 8,025,526 B1 * | 9/2011 | Tormey | B60L 3/0069 320/109 |

(Continued)

*Primary Examiner* — Brian Miller
(74) *Attorney, Agent, or Firm* — Carlson, Gaskey & Olds, P.C.

(57) ABSTRACT

An exemplary locking assembly includes, among other things, a lock that transitions between a first state that prevents disengaging electric vehicle supply equipment from a charge port and a second state that permits the disengaging. A control module is configured to command the lock to transition from the first to the second state in response to a user interaction with a selector device and an authentication of the user interaction. An exemplary securing method includes, among other things, receiving a request to disengage electric vehicle supply equipment (EVSE) from a charge port of a vehicle, permitting a disengaging if the request can be authenticated, and preventing the disengaging if the request cannot be authenticated.

16 Claims, 3 Drawing Sheets

(56) References Cited

U.S. PATENT DOCUMENTS

| | | | |
|---|---|---|---|
| 8,075,329 B1* | 12/2011 | Janarthanam | B60L 11/1818 439/304 |
| 8,123,537 B2* | 2/2012 | Tsuruta | H01R 13/44 439/133 |
| 8,172,599 B2 | 5/2012 | Konchan | |
| 8,262,402 B2 | 9/2012 | Gaul et al. | |
| 8,265,816 B1* | 9/2012 | LaFrance | B60R 25/045 320/109 |
| 8,321,081 B2* | 11/2012 | Nakamura | B60L 3/00 701/22 |
| 8,357,001 B2* | 1/2013 | Katagiri | B60L 11/1818 439/304 |
| 8,514,085 B2* | 8/2013 | Nelson | F16P 3/142 340/573.1 |
| 8,550,833 B2* | 10/2013 | Martin | H01R 13/6395 439/310 |
| 8,758,039 B2 | 6/2014 | Ishida et al. | |
| 8,816,815 B2* | 8/2014 | Kuramochi | H01R 13/6397 340/5.64 |
| 9,279,276 B2* | 3/2016 | Arabia, Jr. | E05B 83/00 |
| 9,296,303 B2* | 3/2016 | Mueller | B60L 11/1818 |
| 9,318,908 B2* | 4/2016 | Chang | H02J 7/0047 |
| 9,352,652 B2* | 5/2016 | Montemayor Cavazos | B60L 11/1818 |
| 9,475,399 B2* | 10/2016 | Fontana | B60L 11/1824 |
| 9,484,755 B2* | 11/2016 | Liu | B60L 11/1809 |
| 9,495,819 B2* | 11/2016 | Morita | B60L 11/1818 |
| 2009/0082916 A1* | 3/2009 | Tanaka | B60K 6/48 701/22 |
| 2010/0194529 A1* | 8/2010 | Yamamoto | B60L 11/1824 340/5.65 |
| 2010/0211272 A1* | 8/2010 | Ichihara | B67D 7/145 701/49 |
| 2011/0300733 A1* | 12/2011 | Janarthanam | B60L 11/1818 439/304 |
| 2012/0071017 A1* | 3/2012 | Gaul | B60L 11/1825 439/304 |
| 2012/0217928 A1* | 8/2012 | Kulidjian | B60L 3/0069 320/109 |
| 2013/0102163 A1* | 4/2013 | Basavarajappa | B60K 15/05 439/34 |
| 2014/0022053 A1* | 1/2014 | Inoue | G07C 9/00174 340/5.61 |
| 2014/0165675 A1* | 6/2014 | Morita | B60L 11/1818 70/256 |
| 2014/0167913 A1* | 6/2014 | Morita | B60L 11/1818 340/5.61 |
| 2014/0179141 A1* | 6/2014 | Kojima | B60L 11/1818 439/296 |
| 2014/0200757 A1* | 7/2014 | Kojima | B60L 11/14 701/22 |
| 2016/0280086 A1* | 9/2016 | Lopez | B60L 11/1818 |

* cited by examiner

LOCKING ASSEMBLY AND METHOD WITH AUTHENTICATED UNLOCKING OF ELECTRIC VEHICLE SUPPLY EQUIPMENT

TECHNICAL FIELD

This disclosure relates generally to unlocking electric vehicle supply equipment from a charge port of an electrified vehicle and, more particularly, to authenticating the unlocking.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Some electrified vehicles charge the battery pack using power from an external power source, such as a grid power source. The electrified vehicles connect to the external power source using electric vehicle supply equipment (EVSE). A cord set is an example type of EVSE. Power moves from the grid power source through the cord set to the electrified vehicle. The power is used to charge the battery. During a charge, the EVSE can be locked to the vehicle to, among other things, prevent theft.

SUMMARY

A locking assembly according to an exemplary embodiment of the current disclosure includes, among other things, a lock that transitions between a first state that prevents disengaging electric vehicle supply equipment from a charge port and a second state that permits the disengaging. A control module is configured to command the lock to transition from the first to the second state in response to a user interaction with a selector device and an authentication of the user interaction In another example of the foregoing assembly, the selector device is disposed on the vehicle outside a passenger compartment of a vehicle.

In another example of any of the foregoing assemblies, the selector device is directly adjacent the charge port.

In another example of any of the foregoing assemblies, the authentication comprises receiving an indication that a key fob is proximate the vehicle without requiring a user to interact with the key fob.

In another example of any of the foregoing assemblies, the authentication comprises receiving an indication that a key fob is proximate the charge port without requiring a user to interact with the key fob.

In another example of any of the foregoing assemblies, the control module and lock comprise portions of a passive entry electrified vehicle.

In another example of any of the foregoing assemblies, the authentication comprises receiving a signal indicating that a vehicle door is unlocked.

In another example of any of the foregoing assemblies, a key fob has a button configured to transition from a first state that does not provide a vehicle door unlock command to a second state that does provide a vehicle door unlock command.

In another example of any of the foregoing assemblies, the authentication is separate from the user interaction with the selector device.

In another example of any of the foregoing assemblies, the control module is further configured to stop a charging of the vehicle in connection with transitioning the lock from the first state to the second state.

An electric vehicle supply equipment securing method according to another exemplary aspect of the current disclosure includes, among other things, receiving a request to disengage electric vehicle supply equipment (EVSE) from a charge port of a vehicle. Disengaging is permitted if the request can be authenticated. Disengaging is prevented if the request cannot be authenticated.

Another example of the foregoing method, includes sending the request when a user interacts with a selector device of the vehicle.

In another example of any of the foregoing methods, the method includes detecting a key fob proximate the vehicle to authenticate the request.

In another example of any of the foregoing methods, the detecting does not require the user to interact with the key fob.

In another example of any of the foregoing methods, the method includes detecting a key fob proximate the charge port to authenticate the request. The detecting occurs without the user interacting with the key fob.

In another example of any of the foregoing methods, the request is authenticated in response to unlocking a vehicle door.

In another example of any of the foregoing methods, the method includes transitioning a button on a key from a first state that does not provide a vehicle door unlock command to a second state that does provide a vehicle door unlock command to transmit the vehicle door unlock command.

In another example of any of the foregoing methods, the method includes transitioning a button on a door of the vehicle from a first state that does not provide a vehicle door unlock command to a second state that does provide a vehicle door unlock command to transmit the vehicle door unlock command.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to authenticating an unlocking of electric vehicle supply equipment (EVSE). Unlocking the EVSE permits a user to move the EVSE from an engaged position with a charged port to a disengaged position. Authenticating the unlocking can prevent unauthorized users from disengaging the EVSE.

Figure 1:
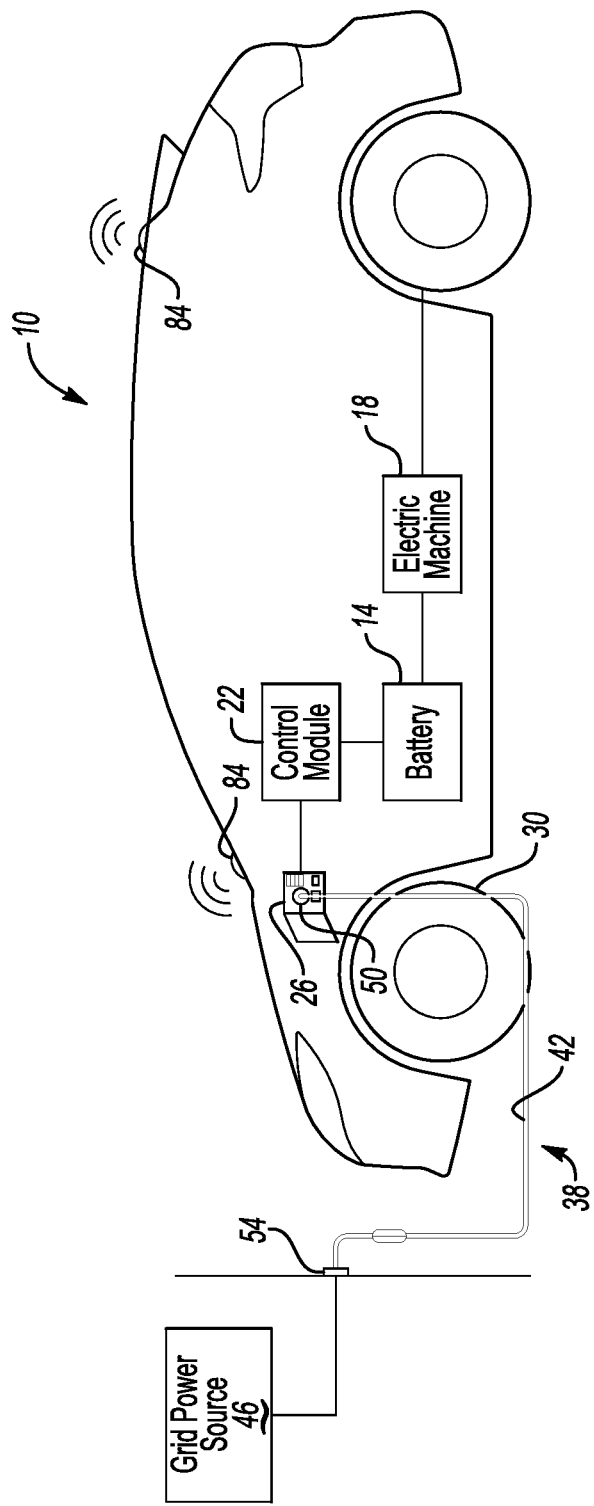
FIG. 1 shows a partially schematic side view of an example electrified vehicle.

Referring to FIG. 1, an example electrified vehicle 10 includes a battery 14, an electric machine 18, a control module 22, a charge port 26, and wheels 30. The electric machine 18 can receive electric power from the battery 14. The electric machine 18 converts the electric power to torque to drive the wheels 30. The exemplary battery 14 is a relatively high voltage traction battery.

The exemplary vehicle 10 is an all-electric vehicle. In other examples, the electrified vehicle is a plug-in hybrid electric vehicle, which selectively drives wheels using torque provided by an internal combustion engine instead of, or in addition to, the electric machine 18.

This disclosure is not limited to the electrified vehicle 10 of FIG. 1 and the teachings of this disclosure could apply to, among other things, any vehicle that connects to EVSE to charge a battery.

The EVSE 38 is shown in an engaged position with the charge port 26. The EVSE 38 is a cord set 42 in this example. The cord set 42 is a type of EVSE 38 that is portable. Other examples of EVSE 38 can include fixed residential or commercial charging stations. For purposes of this disclosure, EVSE 38 includes any device separate from the electrified vehicle 10 that can be used to charge the traction battery 14.

To charge the battery 14, the cord set 42 electrically couples the battery 14 to a power source outside the vehicle 10, such as a grid power source 46. The cord set 42 includes a plug 50 to connect the cord set 42 to the charge port 26, and another plug 54 to connect the cord set 42 to the grid power source 46. The plug 50 is in an engaged position with the charge port 26 of the electrified vehicle 10 when power flows from the grid power source 46 to the battery 14.

Figure 2:
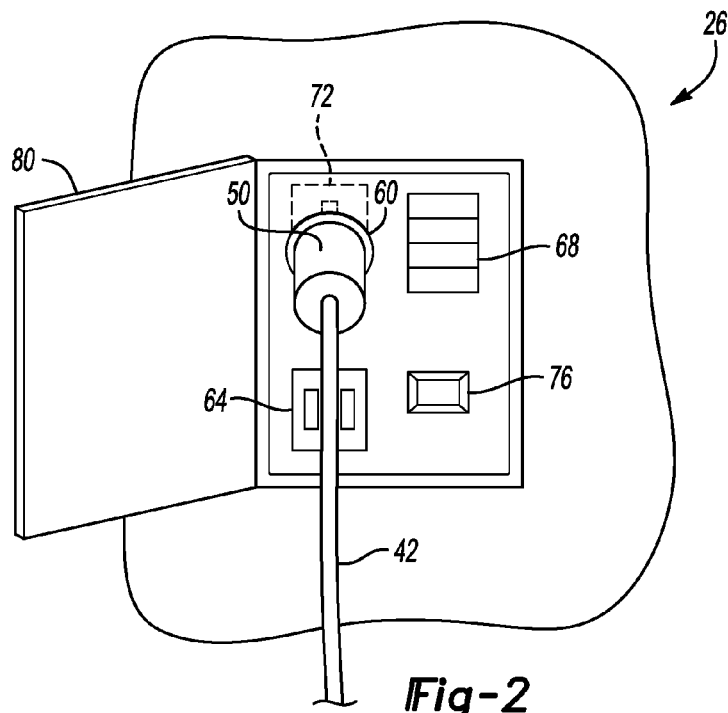
FIG. 2 shows a close-up view of a charge port of the electrified vehicle of FIG. 1 engaged with a cord set.

Referring now to FIG. 2 with continuing reference to FIG. 1, the example charge port 26 generally includes an AC interface 60, a DC interface 64, a display 68, a lock 72, and a selector device 76. At least the DC interface 64 is an optional feature of the charge port 26. That is, although the example charge port 26 includes the DC interface 64, another example charge portion could omit the DC interface. The charge port 26 can be hidden behind a door 80 when the cord set 42 is not engaging the charge port 26.

Figure 3:
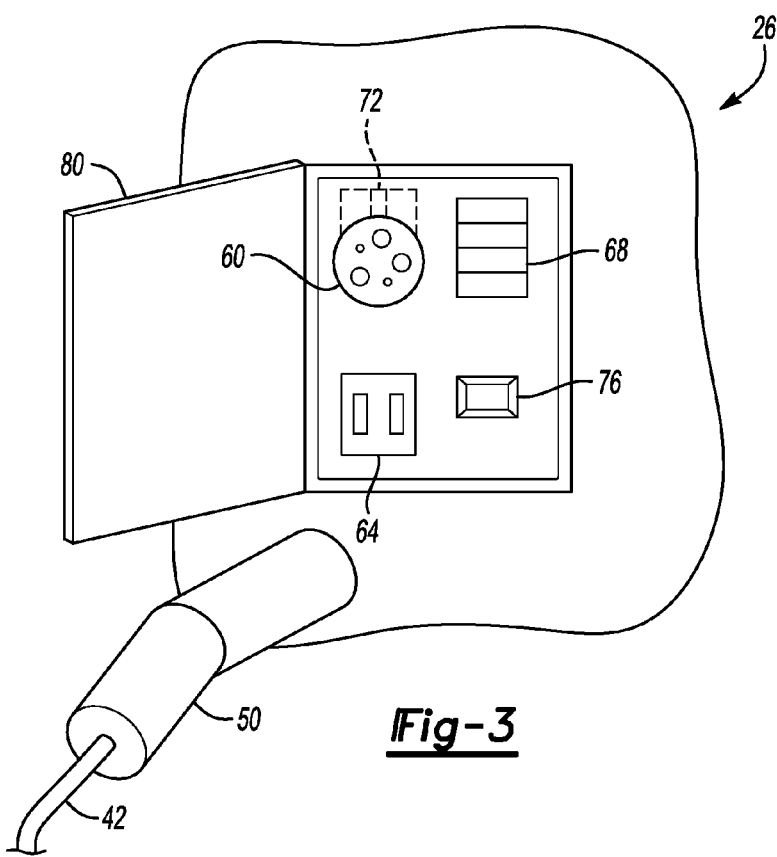
FIG. 3 shows the close-up view of FIG. 2 with the charge set disengaged from the cord port.

The plug 50 of the cord set 42 is in an engaged position with the AC interface 60 of the charge port 26 in FIG. 2, and in a disengaged position in FIG. 3. When the plug 50 is in the engaged position, the lock 72 is transitioned to a first state that prevents movement of the plug 50 to the disengaged position. Locking the plug 50 can prevent theft of the cord set 42 or an undesired stopping of a charge. In this example, the plug 50 can be moved to the disengaged position only if the lock 72 is transitioned to a second state that permits the disengaging.

The example lock 72 includes a solenoid that is activated to transition the lock between the first state and the second state. Activating the solenoid could, for example, cause a pin to be inserted into a corresponding aperture of the plug 50 to lock the plug 50 in the engaged position. Deactivating the solenoid transitions the lock 72 to the second state where the pin is withdrawn from the aperture to permit movement of the plug 50 to the disengaged position. Many other types of locks could be used to selectively hold the plug 50 in the engaged position. Other example locks could include a ring clamp, magnet, or a vacuum system.

Although the lock 72 is shown in connection with the AC interface 60, the same lock 72, or a different lock, could be used to selectively permit or prevent a cord set from disengaging from the DC interface 64.

The plug 50 connects to the AC interface 60 through multiple pin-type connectors. Some of the lines are used to pass power from the grid power source 46 to the battery 14. Other lines transmit information between the cord set 42 and the vehicle 10, or the grid power source 46 and the vehicle 10. Power sent through the AC interface 60 can pass through a charger module that converts the power from the grid power source 46, which is AC, to DC for storage in the battery 14.

Figure 4:
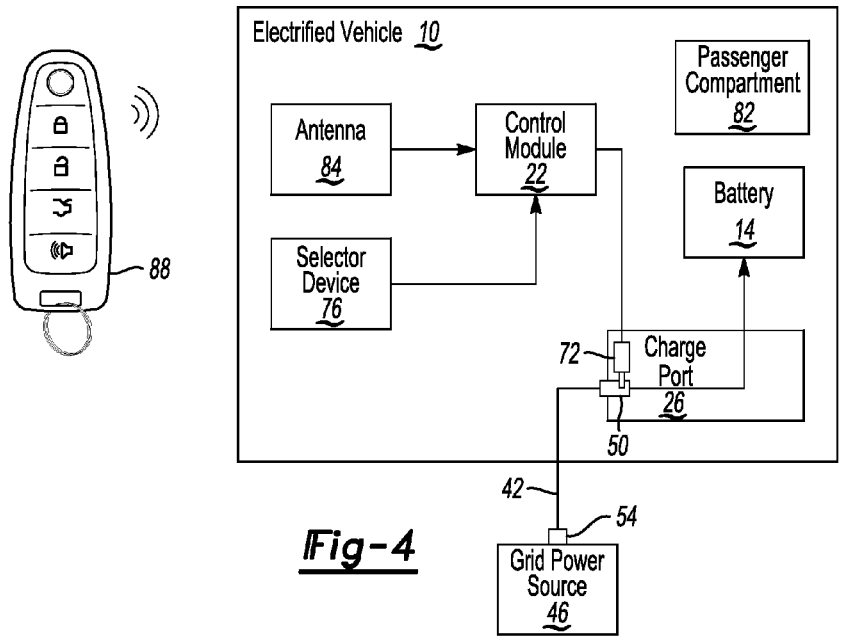
FIG. 4 shows a highly schematic view of the electrified vehicle of FIG. 1.

Referring now to FIG. 4 with continuing reference to FIGS. 1 to 3, the control module 22 can command the lock 72 to transition from the first state that prevents a disengaging of the plug 50 from the charge port 26 to the second state that permits the disengaging. In this example, the control module 22 commands the lock 72 to transition from the first state to the second state in response to both an input from the selector device 76 and an authentication of that input. The control module 22 and the lock 72 provide portions of a locking assembly.

If the user desires to move the plug 50 from an engaged position with the charge port 26 to a disengaged position, transitioning the lock 72 is required. To initiate the transition, the user interacts with the selector device 76. In this example, the selector device 76 is a push-button, and the user interaction is a pressing of the push-button. Other examples of the selector device 76 could include a capacitive sensor or a camera.

The example selector device 76 is within the charge port 26. In other examples, the selector device 76 can be in another area, such as an area of the vehicle 10 adjacent the charge port 26 as shown in the schematic view of FIG. 4. In still other examples, the selector device 76 is on the plug 50 or another portion of the cord set 42. Notably, the selector device 76 is outside of a passenger compartment of the electrified vehicle 10. Thus, to interact with the selector device 76, a user is not required to enter the passenger compartment 82 or unlock doors of the vehicle 10.

The user interaction with the selector device 76 sends a signal to the control module 22 that, if required, wakes the control module 22 and indicates that disengaging the plug 50 from the charge port 26 is desired. In response to the signal, the control module 22 executes an authentication step to confirm that the lock 72 should be transitioned from the first state to the second state. The authentication step helps to ensure that the user is authorized to disengage the plug 50 from the charge port 26, which can discourage theft of the cord set 42.

In this example, the authentication step includes the control module 22 monitoring for a signal from an antenna 84. The signal indicates that a key fob 88 associated with the vehicle 10 is near the vehicle 10. A user carrying the key fob 88 is consider a user that is authorized to disengage the plug 50 and stop the charging. If the key fob 88 is detected near the vehicle 10, the authorized user is very likely to be near the vehicle 10. In response to the user interaction with the selector device 76 and detecting the key fob 88 near the vehicle 10, the control module 22 transitions the lock 72 from the first state to the second state. If the key fob 88 is not detected near the vehicle 10, the lock 72 does not transition from the first state to the second state, even if the user has interacted with the selector device 76.

In some examples, the vehicle 10 includes more than one antenna 84. Each such antenna 84 is configured to receive signals from different areas within and around the vehicle 10. One antenna 84 could receive signals from areas directly adjacent to the charge port 26. Another antenna 84 could receive signals from another area, such as an area at the rear of the vehicle 10.

The control module 22 may, in some examples, only permit the lock 72 to transition from the first state to the second state if the antenna 84 receiving signals from areas directly adjacent the charge port 26 detects the key fob 88. That is, even if the antenna 84 covering an area at the rear of the vehicle 10 detects the key fob 88, the control module 22 does not transmit the lock 72 from the first state to the second state. Thus, the control module 22 can be configured to not only require a signal from the key fob 88 received by the antenna 84, but further require that the signal is received from a specific area. This refined strategy can provide a further confirmation that the user interacting with the selector device 76 is the user carrying the key fob 88.

Upon receipt of the user interaction with the selector device 76 and an authentication of the user interaction, the control module 22 transitions the lock 72 from the first state to the second state to permit the user to disengage the plug 50 from the charge port 26. In connection with transitioning the lock 72, the control module also terminates the charge. This prevents the user from disengaging the plug 50 from the charge port 26 during a charge.

The example electrified vehicle 10 is a passive entry vehicle and the key fob 88 is a smart key. The vehicle 10 can communicate wirelessly with the key fob 88 and can respond to a position of the key fob 88 relative to the vehicle 10. The responses can include, but not limited to, locking and unlocking doors of the vehicle 10 and permitting a drive cycle to begin. The passive entry functionality thus permits the user to keep the key fob 88 in their pocket when locking and unlocking the doors, etc.

The display 68 of the charge port may include, for example, LEDs or some other method of notification indicating to the user that the plug 50 can be removed from the charge port 26. In some examples, the display 68 can provide an indication to the user that, although the user has interacted with the selector device 76 to disengage the plug 50, the user has not been authenticated and the plug 50 is still locked in the engaged position. This could occur, for example, when the user interacts with the selector device 76 to request to disengaging the plug 50 from the charge port 26, but the control module 22 cannot authenticate the user because the key fob 88 is not detected. The notification could include LEDs lit in a first pattern to indicate that the plug 50 can be disengaged, and lit in a different, second pattern to indicate that the plug 50 is locked in the engaged position.

In some examples, if the user wants to disengage the plug 50 and does not have the key fob 88, the control module 22 can obtain an authentication in some other way. For example, the user may unlock the doors of the vehicle 10 using an entry code, for example. The control module 22 receives a signal indicating the door are unlocked and accepts this as an authentication of the user interaction with the selector device 76. The control module 22 then transitions the lock 72 from the first state to the second state. The authentication of the user interaction with the selector device 76 can thus occur in ways other than detecting the key fob 88.

In some examples, the authentication is provided by the vehicle doors being unlocked. If the control module 22 receives an indication that the doors are unlocked, the control module 22 transitions the lock 72 from the first state to the second state in response to a user interaction with the selector device 76 even if the key fob 88 is not near the vehicle 10.

The control module 22 may be part of an overall vehicle control unit, such as a vehicle system control module (VSC), or could alternatively be a stand-alone control unit separate from the VSC. In one non-limiting embodiment, the control module 22 is a battery charger control module. The control module 22 includes executable instructions for interfacing with and commanding operation of the various components of the vehicle 10 including, but not limited to, the battery 14, the electric machine 18, and the cord set 42. The control module 22 can incorporate both a charger module and a battery control module.

In some examples, the battery control module can execute one or more programs that search for the key fob 88, and the charger module retrieves this information from the battery control module via, for example, a CAN protocol.

The control module 22 can include multiple inputs and outputs for interfacing with the various components of the vehicle 10. The control module 22 may additionally include a processing unit and one or more types of memory for executing the various control strategies and modes of the vehicle 10. The strategies and modes can include one or more separate programs, each of which includes an ordered listing of executable instructions for implementing logical functions associated with, for example, controlling the transitions of the lock between the first state and the second state.

Figure 5:
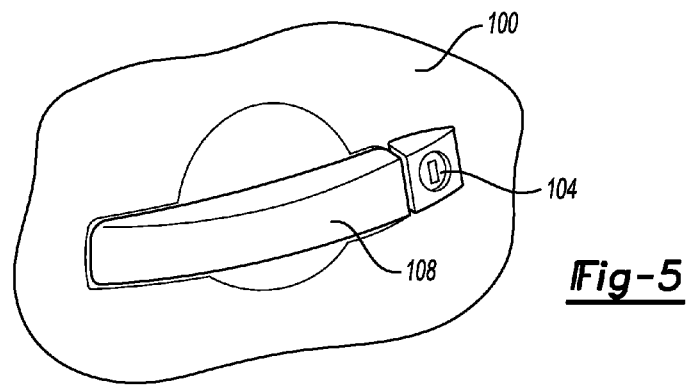
FIG. 5 shows a close-up view of a door lock from a non-passive entry vehicle.
Figure 6:
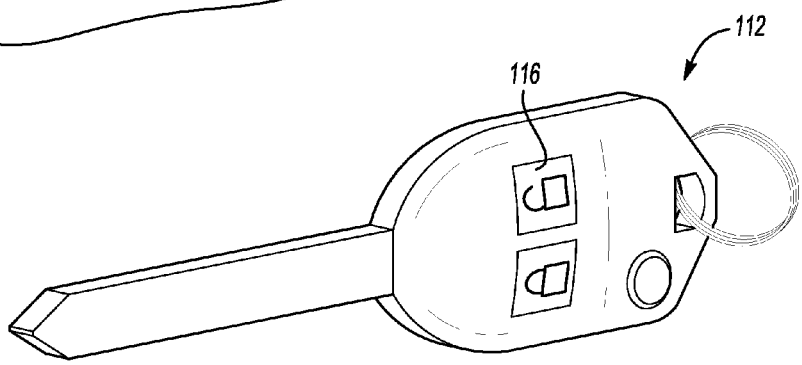
FIG. 6 shows a key for use with a non-passive entry vehicle.

Referring now to FIGS. 5 and 6, some vehicles are non-passive entry vehicles. Unlocking a vehicle door 100 of such vehicles can require a user to actuate a lock cylinder 104 of a door handle 108 using a key 112. Unlocking such vehicles could also occur when a user presses an unlock button 116 on the key. In non-passive entry vehicles, the control module 22 can rely on the unlocking of the door 100 utilizing the lock cylinder 104, or an actuation of the unlock button 116, to authenticate a user interaction with the selector device 76.

For example, a user of a non-passive entry vehicle may interact with a selector device to request a removal of a plug from a charge port. In response, a control module provides a message or alert on the display prompting the user to unlock a door. After confirming that the user has unlocked the door, the control module considers the user interaction with the selector device to be authenticated. In response, the control module stops a charge of the non-passive entry vehicle, and then transitions a lock holding the plug in an engaged position from a first state to a second state that permits the user to move the plug to a disengaged position.

Features of some of the examples of this disclosure include a selector device on or near a charge port. The selector device is used to request disengagement of EVSE from the charge port. If the disengagement is permitted, charging through the charge port is stopped. Because the selector device is used, the user is free to lock and unlock the vehicle doors while the vehicle is charging. Because the selector device is on or near the charge port, the user does not have to enter a passenger compartment of the vehicle to request disengagement of the EVSE.

Substantially the same charge port design can be used in passive entry vehicles and non-passive entry vehicles, which reduces complexity. Further, existing key fobs can be used because the selector device is on or near the charge port and not incorporated into the key fob.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A locking assembly, comprising:
   a lock that transitions between a first state that prevents disengaging electric vehicle supply equipment from a charge port of a vehicle and a second state that permits the disengaging; and
   a control module configured to command the lock to transition from the first to the second state in response to a user interaction with a selector device disposed on the vehicle, and an authentication of the user interaction, the control module is further configured to stop a charging of the vehicle in connection with transitioning the lock from the first state to the second state.

2. The locking assembly of claim 1, wherein the selector device is disposed on the vehicle outside a passenger compartment of a vehicle.

3. The locking assembly of claim 2, wherein the selector device is directly adjacent the charge port.

4. The locking assembly of claim 1, wherein the authentication comprises receiving an indication that a key fob is proximate the vehicle without requiring a user to interact with the key fob.

5. The locking assembly of claim 1, wherein the authentication comprises receiving an indication that a key fob is proximate the charge port without requiring a user to interact with the key fob.

6. The locking assembly of claim 1, wherein the control module and lock comprise portions of a passive entry electrified vehicle.

7. The locking assembly of claim 1, wherein the authentication comprises receiving a signal indicating that a vehicle door is unlocked.

8. The locking assembly of claim 7, comprising a key fob having a button configured to transition from a first state that does not provide a vehicle door unlock command to a second state that does provide a vehicle door unlock command.

9. The locking assembly of claim 1, wherein the authentication is separate from the user interaction with the selector device.

10. A securing method, comprising:
    receiving a request to disengage electric vehicle supply equipment (EVSE) from a charge port of a vehicle, the request sent in response to a user interaction with a selector device disposed on the vehicle;
    stopping a charging of the vehicle and then permitting a disengaging if the request can be authenticated; and
    preventing the disengaging if the request cannot be authenticated.

11. The method of claim 10, comprising detecting a key fob proximate the vehicle to authenticate the request.

12. The method of claim 11, wherein the detecting occurs without the user interacting with the key fob.

13. The method of claim 10, comprising detecting a key fob proximate the charge port to authenticate the request, the detecting occurring without the user interacting with the key fob.

14. The method of claim 10, wherein the request is authenticated in response to unlocking a vehicle door.

15. The method of claim 14, comprising transitioning a button on a key from a first state that does not provide a vehicle door unlock command to a second state that does provide a vehicle door unlock command to transmit the vehicle door unlock command.

16. The method of claim 14, comprising transitioning a button on a door of the vehicle from a first state that does not provide a vehicle door unlock command to a second state that does provide a vehicle door unlock command to transmit the vehicle door unlock command.

* * * * *